F. H. HOLTON.
Erasive Rubber.
No. 233,511.        Patented Oct. 19, 1880.
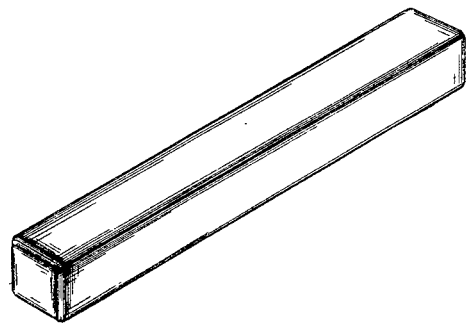
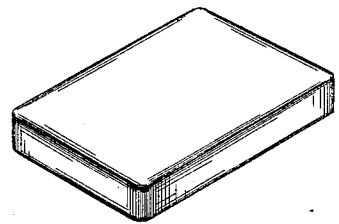 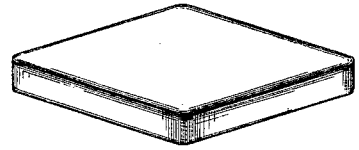
Witnesses.
Louis H. Todd.
John C. Kluber.
Inventor
Francis H. Holton
by Munson & Philipp
Att'ys.

UNITED STATES PATENT OFFICE.

FRANCIS H. HOLTON, OF BROOKLYN, NEW YORK, ASSIGNOR TO ORESTES CLEVELAND, OF JERSEY CITY, NEW JERSEY.

ERASIVE RUBBER.

SPECIFICATION forming part of Letters Patent No. 233,511, dated October 19, 1880.

Application filed June 9, 1877.

*To all whom it may concern:*

Be it known that I, FRANCIS HENRY HOLTON, of Brooklyn, Kings county, New York, have invented an Improvement in Erasive Rubber, of which the following is a specification.

Prior to my invention the tablets or blocks of india-rubber provided for erasing pencil-marks were left with smooth or glazed outer portions or surfaces produced in the process of manufacturing them. These tablets or blocks did not act properly until this hard, smooth, or glazed outer portion or surface was removed, so as to provide a surface suitable for erasive purposes, which was done by the user, either by wearing or rubbing off these portions on paper or other convenient object, or by cutting them away with a knife, so that they would act properly and with the best results.

The object of my invention is to produce these tablets or blocks of rubber so that their outer portions or surfaces shall not be hard, smooth, or glazed, but shall be suitable for immediate use and capable of operating properly at once to remove the pencil-marks; and it consists in a tablet or block of rubber for erasing pencil-marks the outer portions or surfaces of which are soft, ground, or abraded, whereby it is made capable of removing the pencil-marks at once, as will be more fully hereinafter described and claimed.

To produce the rubber tablet or block containing my invention, different shapes of which tablets or blocks are shown in the annexed drawings, I take pieces, tablets, or blocks of rubber made by the common methods of manufacture, and of any well-known or desired shapes and sizes, and place them loosely in a revolving tumbling-box, wherein they are tumbled until the hard, smooth, or glazed outer portion of each of them has become ground or abraded, so that a soft and velvet-like surface and rounded corners are produced, and they can be immediately and effectively used.

Instead of removing the smooth, hard, or glazed outer portions of the pieces, tablets, or blocks of rubber by tumbling them in a tumbling-box, as above described, they may be removed by any of the well-known processes of grinding surfaces.

The advantages possessed by my invention are, that the pieces, tablets, or blocks of rubber are ready for immediate and effective use in erasing pencil-marks without the loss of time and waste of material heretofore referred to.

Having thus described my invention and the merits it possesses, what I claim as new, and desire to secure by Letters Patent, is—

As a new article of manufacture, a tablet or block of rubber for erasing lead-pencil marks, having soft-finished erasive surfaces, substantially as and for the purpose described.

In testimony whereof I have signed my name to this specification in the presence of two subscribing witnesses.

FRANCIS HENRY HOLTON.

Witnesses:
H. T. MUNSON,
JOHN C. KLUBER.